United States Patent
Matama (10) Patent No.: US 7,697,164 B2
(45) Date of Patent: Apr. 13, 2010

(54) MUTUALLY DIFFERENT COLOR CONVERSION IMAGE PROCESSING DEVICE

(75) Inventor: Toru Matama, Asaka (JP)

(73) Assignee: FUJIFILM Corporation, Tokyo (JP)

( * ) Notice: Subject to any disclaimer, the term of this patent is extended or adjusted under 35 U.S.C. 154(b) by 1106 days.

(21) Appl. No.: 10/960,110

(22) Filed: Oct. 8, 2004

(65) Prior Publication Data
US 2005/0088698 A1    Apr. 28, 2005

(30) Foreign Application Priority Data
Oct. 8, 2003    (JP)    ............................ 2003-349598

(51) Int. Cl.
*G06F 15/00* (2006.01)
*G06K 1/00* (2006.01)
*H04N 1/60* (2006.01)
*G06F 3/12* (2006.01)

(52) U.S. Cl. ...................................... 358/1.9; 358/1.13
(58) Field of Classification Search ................. 358/518, 358/540, 538, 1.9, 1.13
See application file for complete search history.

(56) References Cited

U.S. PATENT DOCUMENTS

| | | | | |
|---|---|---|---|---|
| 5,202,935 A | * | 4/1993 | Kanamori et al. | ........... 382/162 |
| 5,477,264 A | * | 12/1995 | Sarbadhikari et al. | .... 348/231.6 |
| 6,992,783 B1 | * | 1/2006 | Sumiuchi | .................... 358/1.15 |
| 7,027,172 B1 | * | 4/2006 | Parulski et al. | ............. 358/1.15 |
| 7,092,122 B2 | * | 8/2006 | Iwaki | .......................... 358/1.9 |
| 7,327,876 B2 | * | 2/2008 | Hoshuyama | ................ 382/167 |
| 2002/0024603 A1 | * | 2/2002 | Nakayama et al. | .......... 348/232 |
| 2004/0057060 A1 | * | 3/2004 | Johannesson et al. | ........ 358/1.9 |

FOREIGN PATENT DOCUMENTS

| | | |
|---|---|---|
| JP | 10-222649 | 8/1998 |
| JP | 2003-078846 A | 3/2003 |
| JP | 2003-145880 A | 5/2003 |

OTHER PUBLICATIONS

Definition of "Chromaticness", Photonics.com.*

* cited by examiner

*Primary Examiner*—Douglas Q Tran
(74) *Attorney, Agent, or Firm*—Sughrue Mion, PLLC (57) ABSTRACT

The image processing device according to the present invention comprises: a first image acquisition device which acquires a portrait image, a first color conversion processing device which subjects the acquired portrait image to a first color conversion, a second image acquisition device which acquires a non-portrait image relating to the portrait image, a second color conversion processing device which subjects the non-portrait image to a second color conversion that is different from the first color conversion, an image superimposing device which superimposes the portrait image which is subjected to the first color conversion and the non-portrait image which is subjected to the second color conversion, and an image output device which outputs the superimposed image.

23 Claims, 4 Drawing Sheets

MUTUALLY DIFFERENT COLOR CONVERSION IMAGE PROCESSING DEVICE

BACKGROUND OF THE INVENTION

1. Field of the Invention

The present invention relates to an image processing device, and more particularly to an image processing device that is capable of superimposing an image in which a human subject(s) is photographed with an image such as a decorative image or a template image.

2. Related Art

An image processing device that superimposes various types of decorative images with a photographic image of a human subject(s) to decorate the photographic image is conventionally known (for example, see Japanese Patent Application Publication No. 2003-145880). For example, a decorative image can be superimposed on an area that is the background, foreground or contour of the human subject as the photographic subject, and the superimposed image can be printed on seal paper or the like.

In this kind of conventional image processing device, since it is less fun when only the standard decorative images can be used for superimposing, in recent years devices have been provided that enable superimposing of a variety of decorative images. For example, a device is provided which allows a user to freely input handwritten characters or a picture using a pen input device, and then superimposes the handwritten image with a photographic image.

SUMMARY OF THE INVENTION

However, despite the fact that in many cases the user desires different tints to be used for the photographic image of the human subject and the decorative image which decorates the portrait image, generally it has been difficult to achieve compatibility that allows the desired tints to appear in both the portrait image and the decorative image.

In particular, the most important point in a portrait image is flesh color, and for example, when attempting to comply with a user's preference that "I want the flesh color to be made lighter than the real flesh color," conversely the vibrancy of the overall colors declines. In particular, the treatment of tints that are close to flesh color is difficult. Further, there is a general tendency to demand vibrant colors in handwritten images, and when attempting to comply with the preferences of such users there are cases where, conversely, the flesh color in the portrait image deviates from the user's preferred color. Thus, a problem has existed in that it has been difficult to achieve compatibility that allows the desired tints to appear in both a portrait image and a decorative image which decorates the portrait image.

The present invention has been made in view of the foregoing circumstances, and it is an object of the present invention to provide an image processing device that enables compatibility which allows tints of a portrait image to be produced as desired and tints of a decorative image which decorates the portrait image to be produced as desired.

To achieve the above object, a first aspect of the present invention is an image processing device, comprising a first image acquisition device which acquires a portrait image; a first color conversion processing device which subjects the acquired portrait image to a first color conversion; a second image acquisition device which acquires a non-portrait image relating to the portrait image; a second color conversion processing device which subjects the non-portrait image to a second color conversion which is different to the first color conversion; an image superimposing device which superimposes the portrait image that underwent the first color conversion and the non-portrait image that underwent the second color conversion; and an image output device which outputs the superimposed image.

According to the first aspect of the present invention, it is possible to perform color conversion processing which imparts to a portrait image tints that are suitable for a portrait image, and to perform color conversion processing which imparts to a decorative image tints that are suitable for a decorative image, such as handwritten characters or a picture, such that a portrait image and a decorative image or the like that have respectively undergone color conversion processing which is suitable for each image are superimposed and output. Further, this configuration also enables clear division of work responsibilities between a group of design engineers involved in work relating to color control for photographic images and a group of design engineers which creates decorative images and the like, thereby enabling enhancement of development efficiency.

Preferably, in the first aspect of the present invention, the non-portrait image is a decorative image including handwritten characters and a picture.

A second aspect of the present invention is an image processing device, comprising a first image acquisition device which acquires a portrait image; a first color conversion processing device which subjects the acquired portrait image to a first color conversion; a second image acquisition device which acquires a non-portrait image such as a decorative image, for example, handwritten characters or a picture, which relates to the portrait image, wherein the non-portrait image is subjected to a second color conversion which is different to the first color conversion; an image superimposing device which superimposes the portrait image that is subjected to the first color conversion and the non-portrait image that is subjected to the second color conversion; and an image output device which outputs the superimposed image.

According to the second aspect of the present invention, it is possible to perform color conversion processing which imparts to a portrait image tints that are suitable for a portrait image, and to acquire an image that has previously undergone color conversion processing which imparts to a decorative image tints that are suitable for a decorative image, such as handwritten characters or a picture, such that a portrait image and a decorative image or the like that have respectively undergone color conversion processing which is suitable for each image are superimposed and output. Further, this configuration also enables clear division of work responsibilities between a group of design engineers involved in work relating to color control for photographic images and a group of design engineers which creates decorative images and the like, thereby enabling enhancement of development efficiency.

Preferably, in the second aspect of the present invention, the non-portrait image is a decorative image including handwritten characters and a picture.

Further, a third aspect of the present invention is the image processing device according to the first or second aspect, wherein the first image acquisition device is a device which photographs a human subject(s), and the first color conversion processing device subjects the portrait image photographed by the first image acquisition device to the first color conversion.

According to the third aspect of the present invention, when a human subject(s) has been photographed, it is possible to obtain a superimposed image for which color conversion is performed to impart appropriate tints to a portrait image and a decorative image, respectively, immediately after the photograph is taken.

A fourth aspect of the present invention is the image processing device according to the first aspect, wherein the second image acquisition device includes a device which allows handwritten input of a character or picture or the like, and the second color conversion processing device performs the second color conversion for a decorative image that is obtained by handwritten input using the second image acquisition device.

According to the fourth aspect of the present invention, when a user has input a handwritten image of their choice, it is possible to obtain a superimposed image for which color conversion is performed to impart appropriate tints to a portrait image and a decorative image, respectively, immediately after the photograph is taken.

A fifth aspect of the present invention is the image processing device according to any of the first to fourth aspects, wherein the first color conversion is a color conversion that lightens a flesh color part of the portrait image.

According to the fifth aspect of the present invention, it is possible to meet a user's request of "I want the flesh color to be made lighter," while at the same time enabling superimposing in which the flesh color of a decorative image or the like are tints which are suited to a decorative image or the like.

A sixth aspect of the present invention is the image processing device according to any of the first to fifth aspects, wherein the second color conversion is a color conversion which increases the saturation of the non-portrait image.

According to the sixth aspect of the present invention, it is possible to meet a user's request of "I want the decorative image to be made colorful," while at the same time enabling superimposing in which the tints of a portrait image are tints which are suited to a portrait image.

A seventh aspect of the present invention is the image processing device according to any of the first to sixth aspects, wherein the invention further comprises a supplementary information acquisition device which acquires supplementary information relating to the portrait image such as preference information regarding a preference of the human subject, for example, regarding lightness, wherein the first color conversion processing device performs the first color conversion based on the supplementary information.

According to the seventh aspect of the present invention, a portrait image in which the user has a particularly high level of interest is subjected to image processing which suits the preferences and the like of the user. Image processing which suits the photographing conditions for a portrait image, for example, exposure conditions, may also be performed for a portrait image.

As described above, according to the present invention, it is possible to achieve compatibility that allows tints of a portrait image and tints of a decorative image which decorates the portrait image to be respectively produced as desired.

DETAILED DESCRIPTION OF THE PREFERRED EMBODIMENTS

Preferred embodiments of the image processing device according to the present invention are described in detail below referring to the attached drawings.

Figure 1:
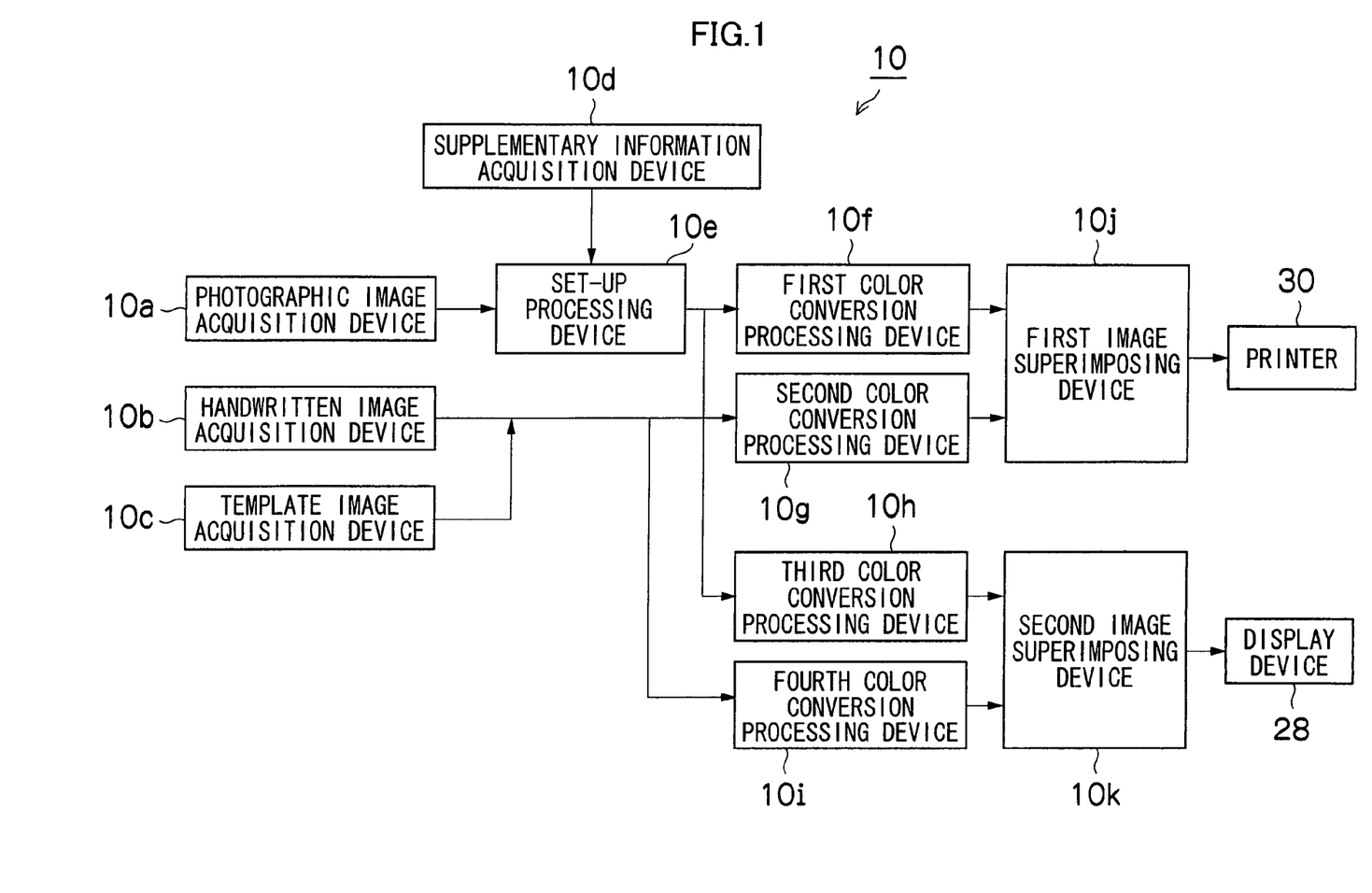
FIG. 1 is a block diagram of principal parts which conceptually shows the outline configuration of an image processing device according to one embodiment of the present invention.

FIG. 1 is a block diagram of principal parts which conceptually shows the outline configuration of an image processing device according to one embodiment of the present invention.

An image processing device 10 shown in FIG. 1 mainly comprises a photographic image acquisition device 10a, a handwritten image acquisition device 10b, a template image acquisition device 10c, a supplementary information acquisition device 10d, a set-up processing device 10e, a first color conversion processing device 10f, a second color conversion processing device 10g, a third color conversion processing device 10h, a fourth color conversion processing device 10i, a first image superimposing device 10j, a second image superimposing device 10k, a display device 28 and a printer 30.

The photographic image acquisition device 10a is a device which acquires a photographic image (also referred to as a "portrait image") in which a human subject(s) is photographed as the photographic subject.

The handwritten image acquisition device 10b is a device which acquires a handwritten image (also referred to as a "decorative image") containing handwritten characters or pictures or the like.

The template image acquisition device 10c is a device which acquires a template image (also referred to as a "substrate image") that will be the frame, background or foreground of a portrait image when printed.

The supplementary information acquisition device 10d is a device which acquires supplementary information relating to the photographic image, such as photographic information relating to the photographing conditions for a photographic image, for example, exposure conditions, and preference information relating to preferences of the human subject such as lightness and the like.

The set-up processing device 10e is a device which performs set-up processing based on the supplementary information. For example, based on the photographic information, when less exposure is used in a photographic image resulting in an image which is dark overall, processing is performed to lighten the overall photographic image.

The first color conversion processing device 10f is a device which performs color conversion for printing purposes with respect to a photographic image. More specifically, color conversion is performed for a photographic image to lighten only a flesh color part, and color conversion is also performed that is suited to the characteristics of the printer 30 and the properties of the print medium.

The second color conversion processing device 10g is a device which performs color conversion for printing purposes with respect to a handwritten image and template image. More specifically, color conversion is performed for a handwritten image and template image which increases the saturation thereof to produce vivid tints, and color conversion is also performed that is suited to the characteristics of the printer 30 and the properties of the print medium.

The third color conversion processing device 10h is a device which performs color conversion for display purposes with respect to a photographic image. More specifically, color conversion is performed for a photographic image to lighten only a flesh color part, and color conversion is also performed that is suited to the characteristics of the display device 28.

The fourth color conversion processing device 10*i* is a device which performs color conversion for display purposes with respect to a handwritten image and a template image. More specifically, color conversion is performed for a handwritten image and a template image which increases the saturation thereof to produce vivid tints, and color conversion is also performed that is suited to the characteristics of the display device 28.

The first image superimposing device 10*j* is a device which superimposes a photographic image for printing that is subject to color conversion by the first color conversion processing device 10*f* with a handwritten image and template image for printing that were subject to color conversion processing by the second color conversion processing device 10*g*.

The second image superimposing device 10*k* is a device which superimposes a photographic image for display that is subject to color conversion by the third color conversion processing device 10*h* with a handwritten image and template image for display that were subject to color conversion processing by the fourth color conversion processing device 10*i*.

The display device 28 is a device which displays a superimposed image for display which is superimposed by the second image superimposing device 10*k*.

The printer 30 is a device which prints on a predetermined print medium a superimposed image for printing which is superimposed by the first image superimposing device 10*j*.

Figure 2:
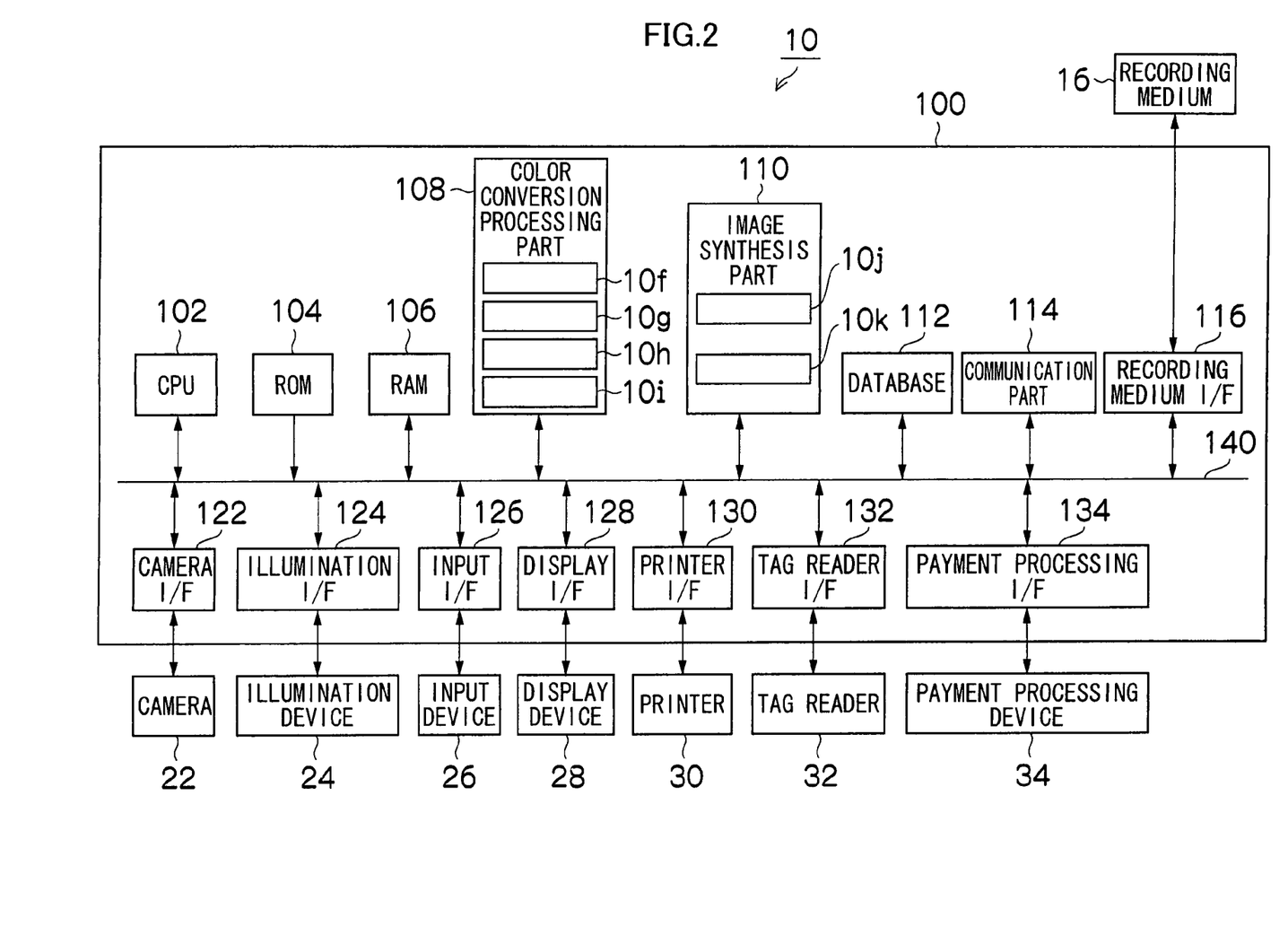
FIG. 2 is a block diagram which shows a specific example of the configuration of an image processing device according to one embodiment of the present invention.

FIG. 2 shows a specific example of the configuration of the image processing device 10 of FIG. 1 in a case where it is applied to a device which is capable of printing a photographic image immediately after the photograph is taken. The image processing device 10 mainly comprises a CPU (central processing unit) 102, a ROM (Read Only Memory) 104, a RAM (Random Access Memory) 106, a color conversion processing part 108, an image superimposing part 110, a database 112, a communication part 114, a recording medium interface 116, a camera interface 122, an illumination interface 124, an input interface 126, a display interface 128, a printer interface 130, a tag reader interface 132, a payment processing interface 134, and an image processing control device 100 which includes a bus 140, and a camera 22, an illumination device 24, an input device 26, a display device 28, a printer 30, a tag reader 32 and a payment processing device 34 which are connected to the image processing control device 100.

The CPU 102 is a device which carries out centralized control of the entire image processing device 10 in accordance with a predetermined program.

The ROM 104 is a device which previously stores a program as well as information that is necessary for implementing the program and the like.

The RAM 106 is a device which temporarily stores an image that is the object of image processing which is used as a work area of a program or the like.

The color conversion processing part 108 is a device which comprises the first color conversion processing device 10*f*, the second color conversion processing device 10*g*, the third color conversion processing device 10*h* and the fourth color conversion processing device 10*i* of FIG. 1. The color conversion processing part 108 may also be configured to be included in the CPU 102.

The image superimposing part 110 is a device which comprises the first image superimposing device 10*j* and the second image superimposing device 10*k* of FIG. 1. The image superimposing part 110 may also be configured to be included in the CPU 102.

The camera 22 is a device which photographs a human subject(s) as a photographic subject. A photographic image obtained with the camera 22 is captured into the RAM 106 via the camera interface 122 by control performed by the CPU 102.

The illumination device 24 is a device which illuminates a human subject(s) as a photographic subject. The illumination device 24 is controlled by the CPU 102 via the illumination interface 124.

The input device 26 and the display device 28 compose an operating panel for allowing a user to perform operations.

The input device 26 is provided with operation buttons and a pen input device which enable the input of photographing instructions, print layout selection, lightness selection, template image selection, input of handwritten images, input of number of prints, input of printing instructions and the like. The input contents are notified to the CPU 102 via the input interface 126.

The display device 28 is configured to individually display a photographic image, handwritten image and template image, and to also display an image in which these images are superimposed. The display device 28 is also capable of displaying various screens, such as a screen to allow a user to select a print layout and a screen for inputting a handwritten image and selecting the color thereof, and it also enables a superimposed image to be reviewed prior to printing. The display device 28 is controlled by the CPU 102 via the display interface 128.

The printer 30 is a device which prints a superimposed image on a predetermined print medium. The printer 30 is controlled by the CPU 102 via the printer interface 130.

The tag reader 32 is a device which reads from a print medium an ID tag that identifies the print medium. The ID tag which is read is notified to the CPU 102 via the tag reader interface 132.

The payment processing device 34 calculates a payment received from a user, and when it is determined that the calculated payment has reached a predetermined amount, the CPU 102 is notified to that effect via the payment processing interface 134.

The database 112 is a device which stores data such as template image data, profile data which defines the color conversion processing of an image, and print layout information that is required for the layout of a image for printing, such as a layout with 8 prints, 16 prints or 32 prints.

The communication part 114 is capable of communication with a predetermined server via a network.

The recording medium interface 116 is capable of receiving data from and giving data to a removable recording medium such as a memory card or a CD-ROM (Compact Disc-Read Only Memory).

The CPU 102 is configured to carry out centralized control of each part of the image processing device 10 and to perform various types of processing, such as set-up processing. It is also configured to carry out processing for compression or expansion of image data which is recorded after being compressed in Motion JPEG (Joint Photographic Experts Group) format or the like. The CPU 102 may also be configured to include the color conversion processing part 108 or the image superimposing part 110.

Hereafter, the relationship between the components which are shown in FIG. 2 and the components of FIG. 1 will be briefly described. The photographic image acquisition device 10*a* comprises the camera 22, the camera interface 122 and the like. The handwritten image acquisition device 10*b* comprises the input device 26, the input interface 126 and the like. The template image acquisition device 10*c* comprises the database 112 and the like. The supplementary information acquisition device 10d comprises the camera 22, the camera interface 122, the input device 26, the input interface 126 and the like. The set-up processing device 10e comprises the CPU 102.

A configuration may be employed in which a photographic image, handwritten image and template image are acquired from a predetermined server (not shown) by the communication part 114, or are acquired from a recording medium 16 via the recording medium interface 116.

Further, the color conversion processing part 108 and the image superimposing part 110 may be comprised by the CPU 102.

A program to be implemented by the CPU 102 may be installed to the image processing device 10 from a CD-ROM on which the program is recorded via the recording medium interface 116. The program may also be downloaded from a server which provides the program via a network and the communication part 114.

Next, the color conversion processing part 108 which performs color conversion processing will be described in detail using FIGS. 3A to 3C.

Figure 3A:
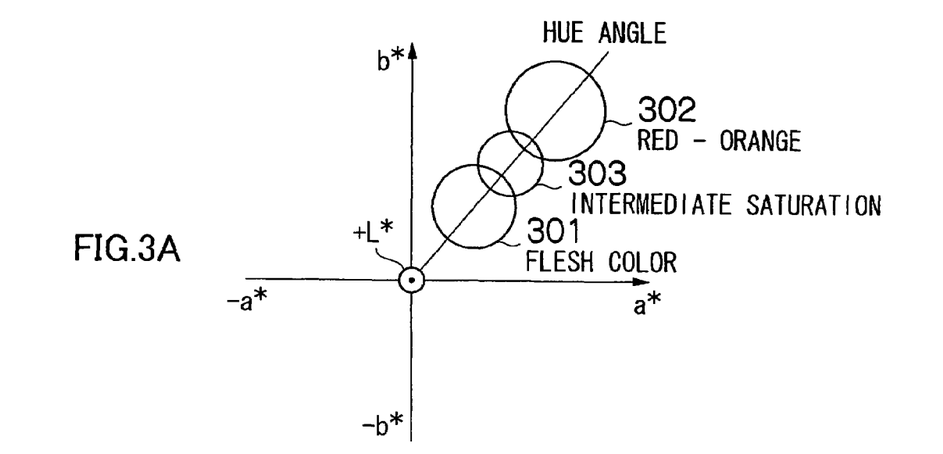
FIGS. 3A, 3B, and 3C are chromaticity diagrams which are used to describe color conversion processing.
Figure 3B:
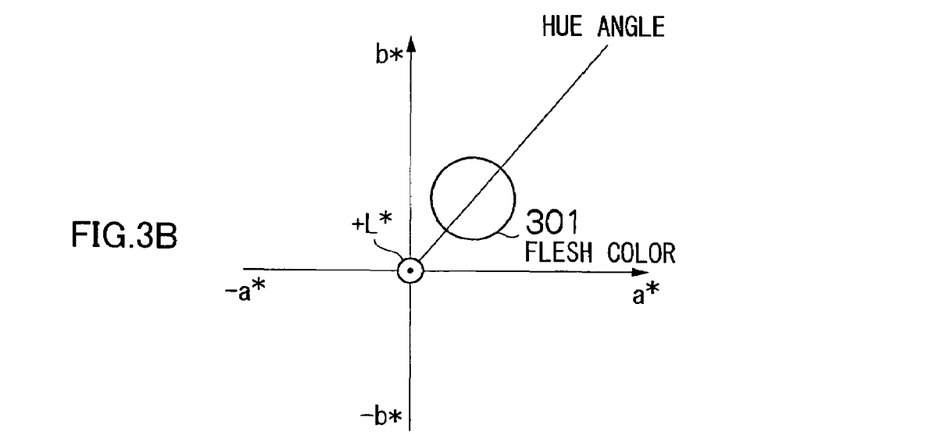
Figure 3C:
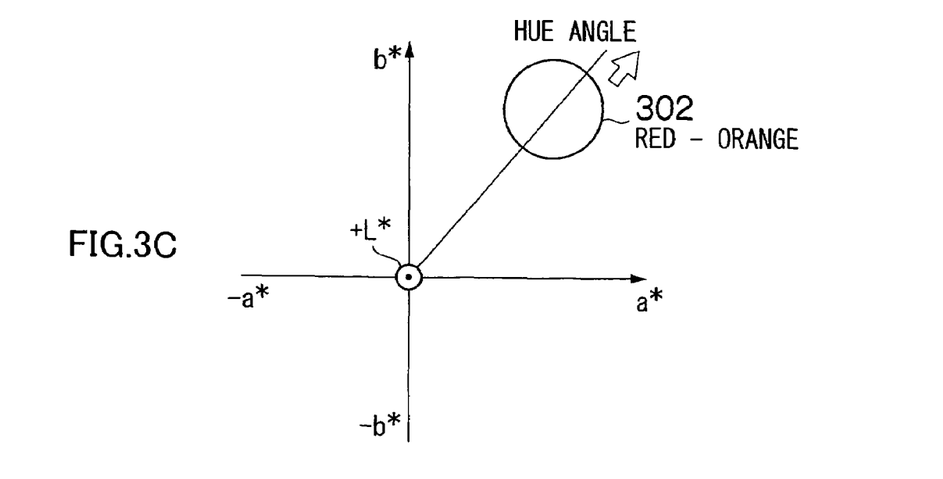

FIGS. 3A, 3B, and 3C show chromaticity diagrams in the L*a*b* (L-star, a-star, b-star) colorimetric system. In the L*a*b* colorimetric system, L* designates lightness, and chromaticity, which indicates hue and saturation, is represented by a* and b*. Regarding L*, the + direction is the direction in which the lightness becomes higher (white direction), while the − direction is the direction in which the lightness becomes lower (black direction). Regarding a*, the + direction is the red direction and the − direction is the green direction, while for b* the + direction is the yellow direction and the − direction is the blue direction. As the numerical value increases, that is, as distance from the center (L*axis) increases, the saturation increases to yield a vivid color. Conversely, as the numerical value decreases, that is, as distance from the center (L* axis) decreases, the saturation decreases to yield a dim color.

As shown in FIG. 3A, in a flesh color region 301 that is particularly important in portrait images, the hue angle is in the vicinity of 45°. Other colors that are positioned in the vicinity of this hue angle of 45° include neutral colors of red and orange in a region 302. Conventionally, treatment of a saturation region 303 that is positioned between the flesh color region 301 and the region of neutral colors of red and orange 302 has been particularly difficult. The color conversion processing for this flesh color region 301 and a region in the vicinity of the flesh color region 301 will be described using FIGS. 3B and 3C.

In the image processing device 10 of the present embodiment, for a portrait image, color conversion is performed by the first color conversion processing device 10f and the third color conversion processing device 10h to increase the lightness of the flesh color region 301 which is shown in FIG. 3B, that is, color conversion is performed in the +L* direction in FIG. 3B. To avoid an abrupt change in lightness between a peripheral region of the flesh color region 301 and a region which adjoins the flesh color region 301, preferably the degree of lightness of the outer part of the flesh color region 301 is lessened in comparison to the central part of the flesh color region 301 to smoothly change the lightness in the direction of an adjoining region.

For a handwritten image, color conversion is performed by the second color conversion processing device 10g and the fourth color conversion processing device 10i to produce a vivid saturation, that is, color conversion is performed in the direction away from the L* axis which is shown by an arrow in FIG. 3C. More specifically, a saturation c* prior to color conversion is represented by numerical formula 1:

$$c^* = (a^{*2} + b^{*2})^{1/2}$$ [Numerical Formula 1]

and a saturation c*' after color conversion is represented by numerical formula 2:

$$c^{*\prime} = k \times c^* \text{ (provided } k>1\text{)}.$$ [Numerical Formula 2]

Thus, color conversion in the direction away from the L* axis which is shown by the arrow is also performed for the red and orange neutral region 302 of handwritten images, similarly to the regions of the other colors.

Preferably, a display image which is shown to a user is subjected to color conversion so that the colors thereof appear close to those of the image printed on a print medium. Thus, while color conversion is performed for an image for printing by the first color conversion processing device 10f and the second color conversion processing device 10g that is based on the characteristics of the printer 30 and the properties of a print medium, for an image for display purposes, color conversion is performed by the third color conversion processing device 10h and the fourth color conversion processing device 10i that is based on the characteristics of the display device 28. In this connection, a print medium is identified by an ID tag which is read by the tag reader 32 of FIG. 2, and a profile that corresponds with the ID tag is then selected by the CPU 102 from among a plurality of profiles which were previously stored in the database 112 to enable color conversion processing which corresponds to the print medium in question to be performed.

The first to fourth color conversion processing devices 10f, 10g, 10h and 10i perform color conversion processing based on first to fourth profiles for each color conversion processing. These first to fourth profiles are, for example, previously recorded in the database 112 of FIG. 2 as a 3-DLUT (3-Dimension Look Up Table) for three-dimensional color conversion processing of R (red), G (green) and B (blue). The color conversion processing part 108 performs color conversion processing by referring to the 3-DLUT for each color conversion processing.

Next, image superimposing processing which is performed by the image superimposing part 110 will be described.

Figure 4:
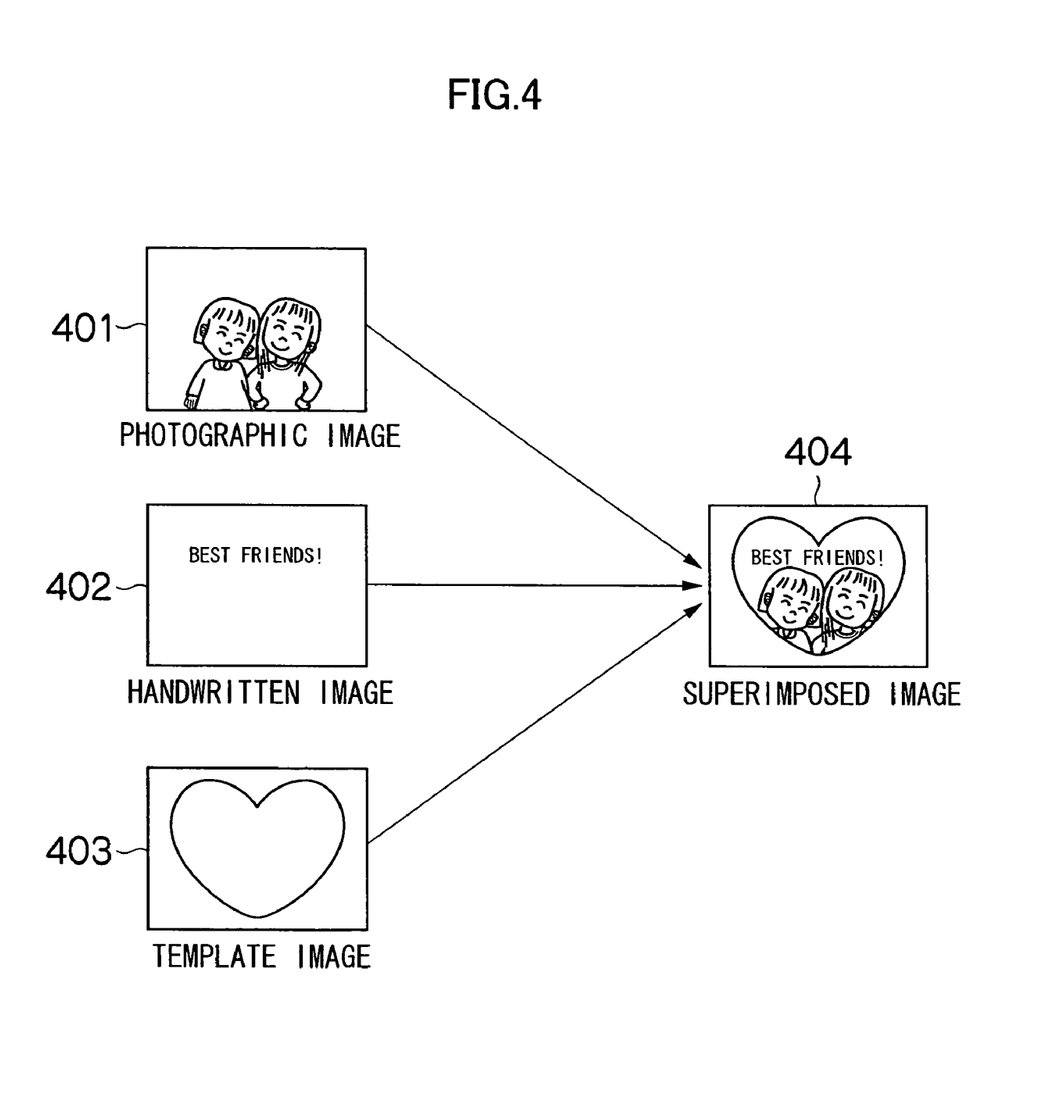
FIG. 4 is an explanatory drawing which is used to explain image superimposing.

FIG. 4 shows an example of a photographic image 401, a handwritten image 402, a template image 403, and a superimposed image 404 in which the photographic image 401, handwritten image 402 and template image 403 have been superimposed.

The photographic image 401 is, for example, an image acquired from the camera 22 via the camera interface 122. Herein, a photographic image is not limited to an image acquired from the camera 22, and may be an image which is acquired through the recording medium interface 116 from the recording medium 16 that has been previously photographed by a cellular telephone or digital camera or the like which the user possesses, or may be an image which is attached to an electronic mail and acquired through the communication part 114.

The handwritten image 402 is an image which is acquired through the input interface 126 after being input by pen at the input device 26. The handwritten image 402 is not limited to characters and, for example, may include a picture representing flowers or an animal. In practice, designation of various colors is performed by a user while changing colors using a palette for designating colors which is displayed by the display device 28, to thereby generate a handwritten image having an abundance of colors. For example, handwriting can be input in seven colors. A variety of neutral colors can also be input. Further, various decorative images which were previously stored in the database 112 or various decorative images which were acquired by downloading through the communication part 114 from a predetermined server which provides decorative images through a network may be used in place of a handwritten image which is input by pen using the input device 26.

The template image 403 is, for example, an image which is previously stored in the database 112 or an image acquired by downloading through the communication part 114 from a predetermined server which provides template images through a network. This template image is not limited to the template image 403 as a frame or foreground of the photographic image 401, and may be a background or the like. The photographic image 401 may be photographed with a blue back, and the template image may be superimposed to the blue back part of the photographic image 401.

As described above, color conversion to lighten a flesh color part is performed for the photographic image 401 by the first color conversion processing device 10f and the third color conversion processing device 10h. For the handwritten image 402, color conversion is performed to make the colors vivid by the second color conversion processing device 10g and the fourth color conversion processing device 10i. In the present embodiment, color conversion is also performed for the template image 403 to make the colors vivid by the second color conversion processing device 10g and the fourth color conversion processing device 10i, similarly to the handwritten image.

The image superimposing part 110 superimposes the photographic image 401, the handwritten image 402 and the template image 403 to generate the superimposed image 404. For the superimposed image 404, in practice, a superimposed image for displaying by the display device 28 and a superimposed image for printing by the printer 30 are generated separately.

Next, the flow of image processing performed by the image processing device 10 of the present embodiment will be described. Each step of the image processing described below is implemented according to a predetermined program by means of centralized control of the CPU 102.

First, a photographic image (portrait image) in which a human subject is photographed as a photographic subject is acquired. For example, in FIG. 2, when a photograph button is pressed at the input device 26, by means of control performed by the CPU 102 a photographic subject is photographed by the camera 22 and the photographic image from the camera 22 is captured into a predetermined photographic image storage region within the RAM 106 via the camera interface 122.

A template image as the frame, background or foreground of the photographic image is also acquired. For example, in FIG. 2, a template image selected by the user using the input device 26 is captured into a predetermined template image storage region within the RAM 106 from the database 112 or the like by means of control performed by the CPU 102.

Handwritten images such as handwritten characters or pictures are also acquired. For example, in FIG. 2, when the user performs an operation to input handwritten characters or pictures or the like by pen input at the input device 26, the handwritten image is captured into a predetermined handwritten image storage region within the RAM 106 by means of control performed by the CPU 102.

Supplementary information is also acquired. For example, in FIG. 2, information (photographic information) relating to photographic conditions of a photographic image such as exposure conditions or the like which is detected by the camera 22 or the like is acquired by the CPU 102. Further, for example, information (preference information) relating to preferences of the user, such as lightness, which is input by the user by means of the input device 26 is acquired by the CPU 102. Also, for example, print layout information, such as information which designates a layout with 8 prints, 16 prints or 32 prints, which is selected by the user by means of the input device 26 is acquired by the CPU 102.

Set-up processing is performed for the photographic image based on supplementary information. For example, based on the photographic information, when less exposure is used in a photographic image resulting in an image which is dark overall, processing is performed to lighten the overall photographic image.

Mutually different color conversion processing is performed with respect to the photographic image and the handwritten image and template image to generate a superimposed image for displaying to be displayed by the display device 28 and a superimposed image for printing to be printed by the printer 30.

In the first color conversion processing, that is, color conversion processing for printing purposes which is performed for a photographic image, based on a profile for first color conversion processing, color conversion is performed to lighten only a flesh color part, and color conversion is also performed which is suited to the characteristics of the printer 30 and the properties of the print medium.

In the simultaneously performed second color conversion processing, that is, color conversion processing for printing which is performed for a handwritten image and template image, based on a profile for second color conversion processing, color conversion is performed which increases the saturation so as to yield vivid tints, and color conversion is also performed which is suited to the characteristics of the printer 30 and the properties of the print medium.

Further, in the third color conversion processing, that is, color conversion processing for displaying which is performed for the photographic image, based on a profile for third color conversion processing, color conversion is performed that makes only a flesh color part lighter than it really is, and color conversion is also performed which is suited to the characteristics of the display device 28.

In the simultaneously performed fourth color conversion processing, that is, color conversion processing for displaying which is performed for a handwritten image and template image, based on a profile for fourth color conversion processing, color conversion is performed which increases the saturation so as to yield vivid tints, and color conversion is also performed which is suited to the characteristics of the display device 28.

A photographic image for printing and a handwritten image and template image for printing that have been subjected to mutually different color conversion processing as described above, are superimposed to generate a superimposed image for printing. Further, a photographic image for displaying and a handwritten image and template image for displaying that have been subjected to mutually different color conversion processing as described above, are superimposed to generate a superimposed image for displaying.

A superimposed image for displaying is displayed by the display device 28, and a superimposed image for printing is printed by the printer 30 onto a predetermined print medium.

In superimposed images which are displayed and output in this manner by the display device 28 and the printer 30, a flesh color part of a human subject is output lighter than it is in reality, and a decorative image or template image part is output in vivid colors. Further, a superimposed image having tints that are roughly equivalent to those of a superimposed image which is output by the printer 30 is displayed by the display device 28.

By separating the color conversion processing performed for a photographic image and the color conversion processing performed for a handwritten image and template image, it is possible to clearly divide work responsibilities between a group of design engineers involved in design of a camera or printer that performs color control for photographic images and a group of design engineers involved in design of a printer or designer that creates handwritten images or template images, thereby enabling the development efficiency to be enhanced.

Further, even when camera or lighting conditions change, the situation can be dealt with by modifying only profiles for a photographic image, without changing the color conversion processing for a handwritten image or template image.

Although an example is described above in which supplementary information acquired by the supplementary information acquisition device 10*d* is used only by the set-up processing device 10*e*, the supplementary information may be referred to by the first color conversion processing device 10*f* and the third color conversion processing device 10*h* which perform color control for a flesh color part, to perform color conversion processing based on the supplementary information. For example, color conversion processing may be performed for a photographic image by the first color conversion processing device 10*f* and the third color conversion processing device 10*h* based on photographic information relating to photographic conditions of a portrait image, such as exposure conditions, or preference information relating to preferences of a user, such as lightness. Color conversion processing may also be performed at a gradation decided by the user, for example, when the user prefers skin lightening the degree of lightening of the flesh color part of a photographic image can be increased.

Further, although an example is described in which the color conversion processing performed for a template image is the same as that for a handwritten image, a template image which has undergone appropriate color conversion which corresponds to the second color conversion and fourth color conversion may be previously stored in the database 112 or the like, such that color conversion of a template image need not be performed by the second and fourth color conversion processing devices 10*g* and 10*i*.

Also, while an example is described in which a handwritten image is acquired and superimposed, the present invention can also be applied to an image processing device that does not superimpose a handwritten image and only superimposes a template image and a photographic image.

The examples shown in the drawings are provided to aid the understanding of the present invention, and are not intended to limit the present invention, and the present invention may of course be applied to various image processing devices which superimpose a portrait image and a non-portrait image for output without departing from the spirit and scope of the present invention.

What is claimed is:

1. An image processing device, comprising:
   a first image acquisition device which acquires a portrait image;
   a first color conversion processing device which subjects the acquired portrait image to a first color conversion;
   a second image acquisition device which acquires a non-portrait image relating to the portrait image;
   a second color conversion processing device which subjects the non-portrait image to a second color conversion that is different from the first color conversion;
   a first image superimposing device which superimposes the portrait image which is subjected to the first color conversion and the non-portrait image which is subjected to the second color conversion;
   a first image output device which outputs a first superimposed image obtained from the first image superimposing device;
   a third color conversion processing device which subjects the acquired portrait image to a third color conversion;
   a fourth color conversion processing device which subjects the non-portrait image to a fourth color conversion that is different from the third color conversion;
   a second image superimposing device which superimposes the portrait image which is subjected to the third color conversion and the non-portrait image which is subjected to the fourth color conversion; and
   a second image output device which outputs a second superimposed image obtained from the second image superimposing device.

2. The image processing device according to claim 1, wherein the non-portrait image is a decorative image including handwritten characters and a picture.

3. The image processing device according to claim 1, wherein the first image acquisition device is a device which photographs a human subject(s), and the first color conversion processing device subjects the portrait image photographed by the first image acquisition device to the first color conversion.

4. The image processing device according to claim 1, wherein the second image acquisition device includes a device which allows handwritten input of characters or a picture or the like, and the second color conversion processing device subjects the non-portrait image which is obtained by handwritten input using the second image acquisition device to the second color conversion.

5. The image processing device according to claim 1, further comprising a supplementary information acquisition device which acquires supplementary information relating to the portrait image such as preference information regarding a preference of a user concerning lightness or the like, wherein the first color conversion processing device provides the first color conversion based on the supplementary information.

6. The image processing device according to claim 1, wherein the second color conversion processing device subjects the acquired non-portrait image to the second color conversion that is different from the first color conversion.

7. The image processing device according to claim 3, wherein the second image acquisition device includes a device which allows handwritten input of characters or a picture or the like, and the second color conversion processing device subjects the non-portrait image which is obtained by handwritten input using the second image acquisition device to the second color conversion.

8. The image processing device according to claim 1, wherein the first color conversion is a color conversion that lightens only a flesh color region of the portrait image and a degree of lightness of an outer part of the flesh color region is lessened in comparison to a degree of lightness of a central part of the flesh color region.

9. The image processing device according to claim 8, wherein a degree of lightness of the flesh color region is gradually lessened in a direction towards the outer part of the flesh color region.

10. The image processing device according to claim 1, wherein the first and third color conversions are color conversions that lightens only a flesh color region of the portrait image and a degree of lightness of an outer part of the flesh color region is lessened in comparison to a degree of lightness of a central part of the flesh color region.

11. The image processing device according to claim 1, wherein the first and second color conversions are performed based on characteristics of a printer and properties of a print medium, and the third and fourth color conversion processes are performed based on the characteristics of a display device, wherein the printer is the first image output device and the display device is the second image output device, and the first and third color conversions are color conversions that lightens only a flesh color region of the portrait image.

12. The image processing device according to claim 11, wherein performing the first, second, third and fourth color conversions are separate and distinct operations.

13. The image processing device according to claim 1, wherein performing the first, second, third and fourth color conversions are separate and distinct operations.

14. The image processing device according to claim 1, wherein the first, second, third and fourth color conversion processing devices perform the first, second, third and fourth color conversions, respectively, based on a device independent color space.

15. The image processing device according to claim 1, wherein the first, second, third and fourth color conversion processing devices perform the first, second, third and fourth color conversions, respectively, according to a L*a*b* colorimetric system, where L* designates lightness and a*b* designates chromaticity.

16. An image processing device, comprising:
a first image acquisition device which acquires a portrait image;
a first color conversion processing device which subjects the acquired portrait image to a first color conversion;
a second image acquisition device which acquires a non-portrait image relating to the portrait image, wherein the non-portrait image is subjected to a second color conversion which is different to the first color conversion;
a first image superimposing device which superimposes the portrait image that is subjected to the first color conversion and the non-portrait image that is subjected to the second color conversion; and
a first image output device which outputs a first superimposed image obtained from the first image superimposing device
a third color conversion processing device which subjects the acquired portrait image to a third color conversion;
the second image acquisition device acquiring the non-portrait image which is subjected to a fourth color conversion that is different from the third color conversion;
a second image superimposing device which superimposes the portrait image which is subjected to the third color conversion and the non-portrait image which is subjected to the fourth color conversion; and
a second image output device which outputs a second superimposed image obtained from the second image superimposing device.

17. The image processing device according to claim 16, wherein the non-portrait image is a decorative image including handwritten characters and a picture.

18. The image processing device according to claim 16, wherein the first color conversion is a color conversion that lightens only a flesh color region of the portrait image and a degree of lightness of an outer part of the flesh color region is lessened in comparison to a degree of lightness of a central part of the flesh color region.

19. The image processing device according to claim 18, wherein a degree of lightness of the flesh color region is gradually lessened in a direction towards the outer part of the flesh color region.

20. The image processing device according to claim 16, wherein the first and second color conversions are performed based on characteristics of a printer and properties of a print medium, and the third and fourth color conversion processes are performed based on the characteristics of a display device, wherein the printer is the first image output device and the display device is the second image output device, and the first and third color conversions are color conversions that lightens only a flesh color region of the portrait image.

21. The image processing device according to claim 20, wherein performing the first, second, third and fourth color conversions are separate and distinct operations.

22. The image processing device according to claim 16, wherein performing the first, second, third and fourth color conversions are separate and distinct operations.

23. An image processing device, comprising:
a first image acquisition device which acquires a portrait image;
a first color conversion processing device which subjects the acquired portrait image to a first color conversion;
a second image acquisition device which acquires a non-portrait image relating to the portrait image;
a second color conversion processing device which subjects the non-portrait image to a second color conversion that is different from the first color conversion;
an image superimposing device which superimposes the portrait image which is subjected to the first color conversion and the non-portrait image which is subjected to the second color conversion; and
an image output device which outputs the superimposed image,
wherein the first color conversion is a color conversion that lightens only a flesh color region of the portrait image and a degree of lightness of an outer part of the flesh color region is lessened in comparison to a degree of lightness of a central part of the flesh color region.

* * * * *